H. J. DAY AND G. J. FINN.
TRAIN SHEET.
APPLICATION FILED MAY 19, 1920.

1,395,177. Patented Oct. 25, 1921.

UNITED STATES PATENT OFFICE.

HARVEY J. DAY AND GILBERT J. FINN, OF EAU CLAIRE, WISCONSIN.

TRAIN-SHEET.

1,395,177. Specification of Letters Patent. Patented Oct. 25, 1921.

Application filed May 19, 1920. Serial No. 382,458.

*To all whom it may concern:*

Be it known that we, HARVEY J. DAY and GILBERT J. FINN, citizens of the United States of America, residing at Eau Claire, in the county of Eau Claire and State of Wisconsin, have invented new and useful Improvements in Train-Sheets, of which the following is a specification.

The object of the invention is to provide simple and efficient means whereby a train despatcher's record of a train and its progress and condition throughout its route may be readily prepared for transmission to the office for information of the officials and as a matter of permanent record for future reference in connection with the operation of the road; and with these objects in view, the invention consists in a construction and combination of parts, of which a preferred embodiment is shown in the drawing wherein the figure represents a diagram or chart of a train sheet.

The device consists essentially of a sheet or chart having vertical columns 10 and 11 representing the terminals of a railroad route or system, and intermediate vertical columns 12 and 13 which, when the device is in use, are respectively progressively designated to represent the intermediate stations or stops (not shown) between said terminals, and these terminal and intermediate vertical columns are intersected by the lines 14 and 15 which are distinguishably designated as by color or otherwise as indicated by dashes and dots in the drawings, to represent the progress of trains in opposite directions between the terminals with the progress or movement of the trains indicated at the head of the chart respectively by the indexes 16 and 17 which are distinguishably designated corresponding with the designations of said lines 14 and 15 and these route lines are inter-currently disposed upon the chart as above indicated in intersecting relation with the vertical columns and thus sub-divide the columns into spaces which in so far as the intermediate columns are concerned, are adapted to receive data or records in relation to the respective stations along the route of the train, in reference to the amount of freight or express matter taken on or delivered or the number of passengers alighting from and boarding the train and the like according to whether the particular sheet in question is employed in the passenger or freight service.

The terminal columns are sub-divided to form divisional vertical columns indicated for example at $10^a$ and $10^b$ respectively and $11^a$ and $11^b$, etc., also intersected by the longitudinal route lines of the train, to provide spaces for the reception of data in regard to the train crews, and personnel, times of train departures, times of train or trip service of the members of the crew, and the like, or in other words, such information as is required by the administration offices of a railroad company as a matter of record and history for use in making up payrolls, freight and other charges, accounts of expense and profit and the like.

The distinguishably designated route lines disposed as above indicated in inter-current relation with and intersecting the vertical columns representing the terminal and the intermediate stop points along the routes of the trains enable the compiler of the record to place the various items of information and data in such relation to each other as to be readily understood and utilized at the main office without confusion.

The invention having been described, what is claimed as new and useful is:—

A train sheet having vertical lines defining terminal vertical columns and intermediate vertical columns, the said terminal columns having indicia representative of the terminals of a railroad group or system and the intermediate columns bearing a general designation indicative of the fact that the said intermediate columns are arranged for progressive designation to represent intermediate stops between the terminals, indexes at the top of the sheet distinguishably designated, and a plurality of horizontal lines intersecting the columns and distinguishably designated in the same manner as the indexes and identifying the indexes with the columns, all the columns being sub-divided for the terminal columns to receive train data and the intermediate columns to receive station data.

In testimony whereof we affix our signatures.

HARVEY J. DAY.
GILBERT J. FINN.